Figure 1:
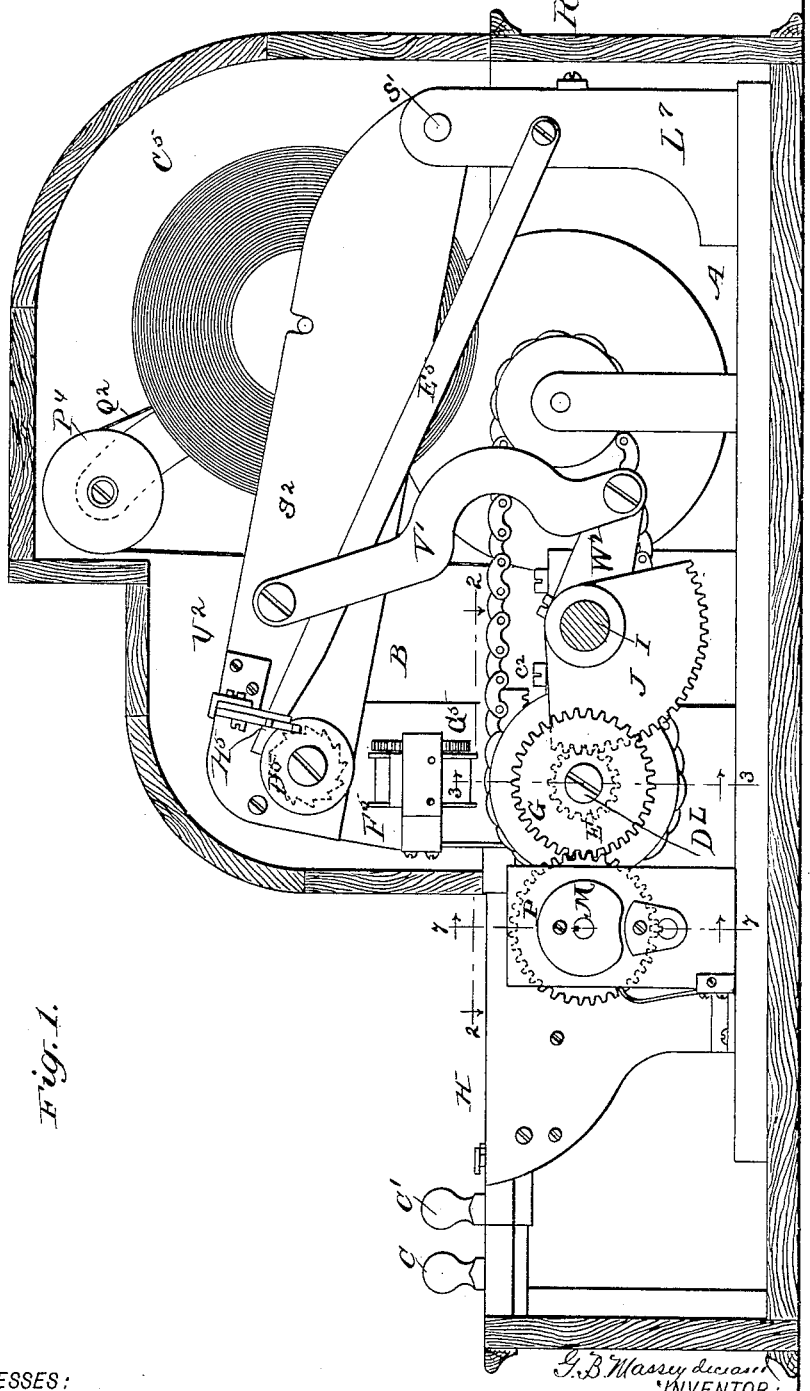

(No Model.) 5 Sheets—Sheet 1.

G. B. MASSEY, Dec'd.
S. R. MASSEY, Administratrix & S. A. BRYANT, Administrator.
ADDING ATTACHMENT FOR CASH REGISTERING MACHINES.

No. 477,563. Patented June 21, 1892.

WITNESSES:
J. C. Criswell
E. Sedgwick

INVENTOR:
G. B. Massey deceased
S. R. Massey
S. A. Bryant
Administrators
BY Munn & Co.
ATTORNEYS

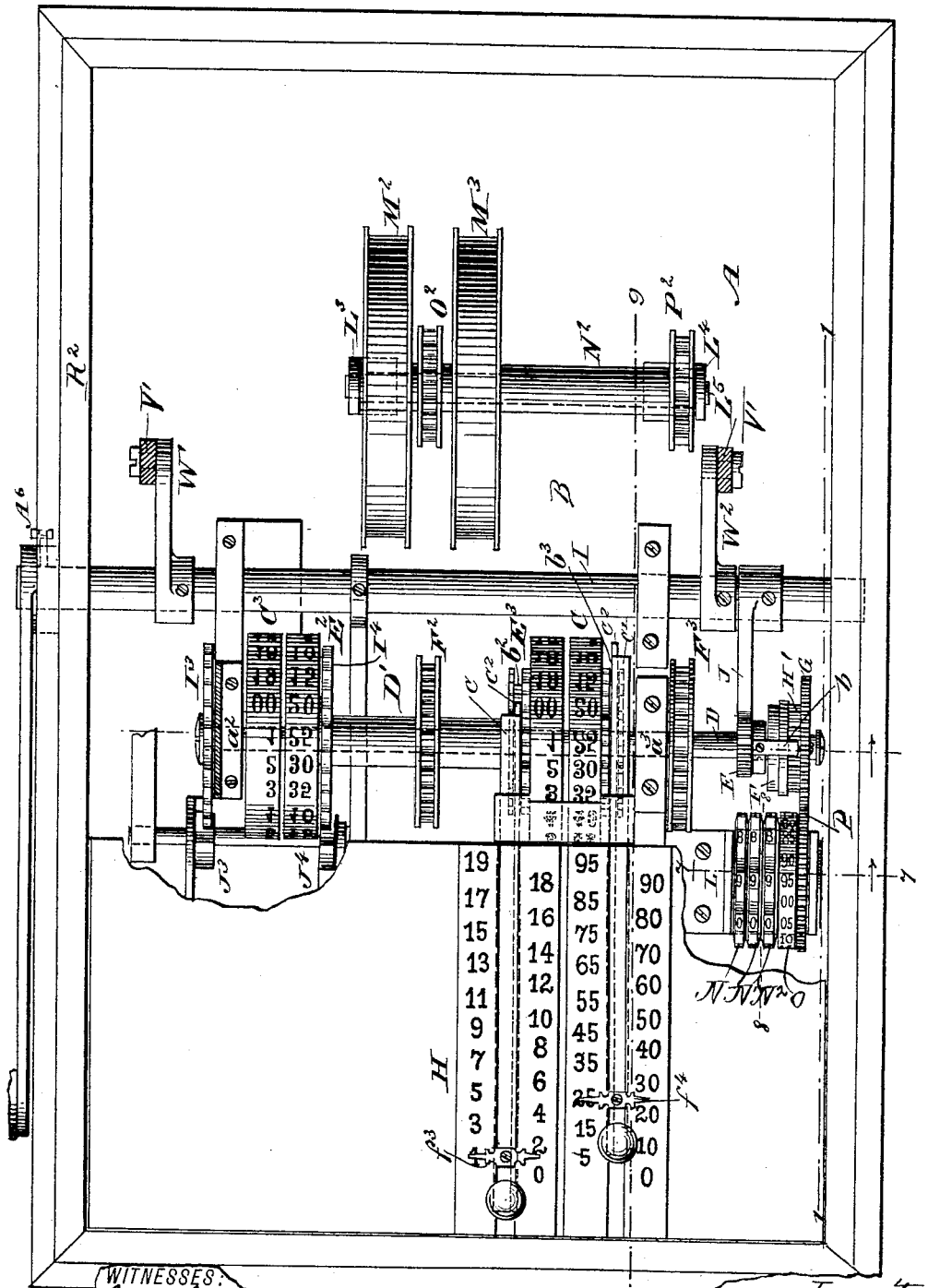

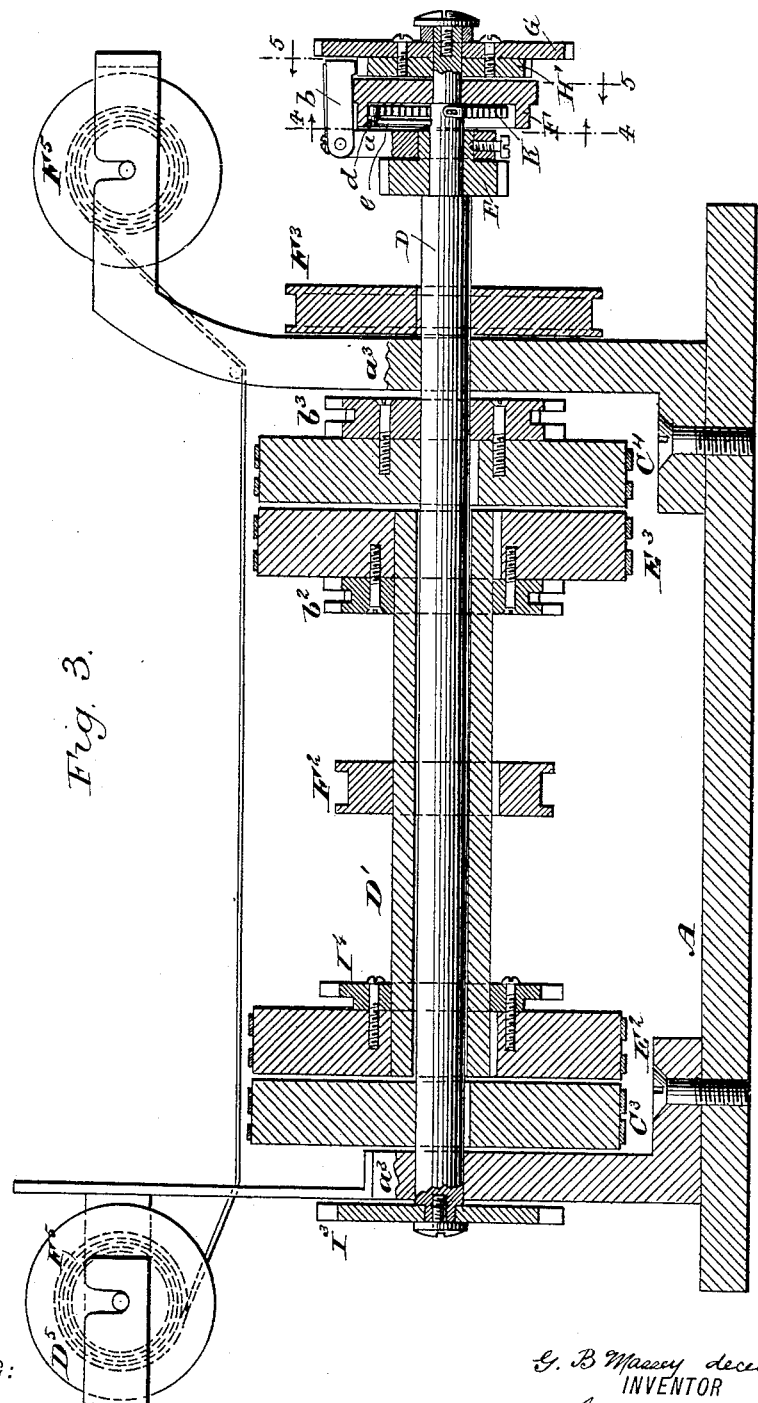

(No Model.) 5 Sheets—Sheet 4.
G. B. MASSEY, Dec'd.
S. R. MASSEY, Administratrix & S. A. BRYANT, Administrator.
ADDING ATTACHMENT FOR CASH REGISTERING MACHINES.
No. 477,563. Patented June 21, 1892.
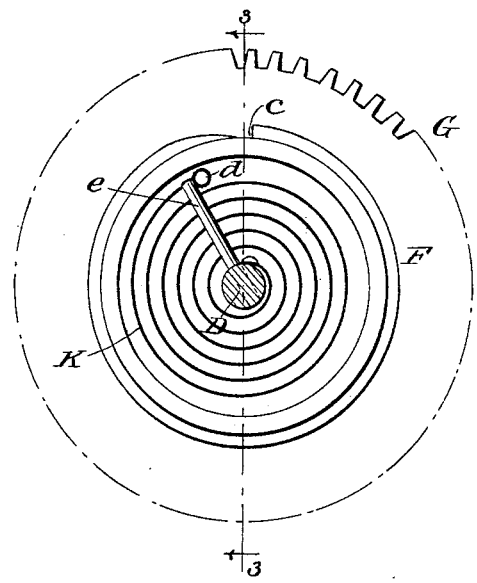
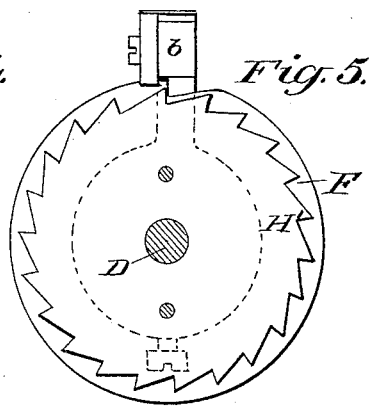
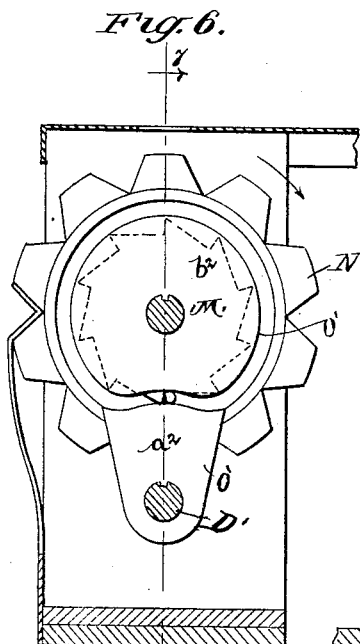
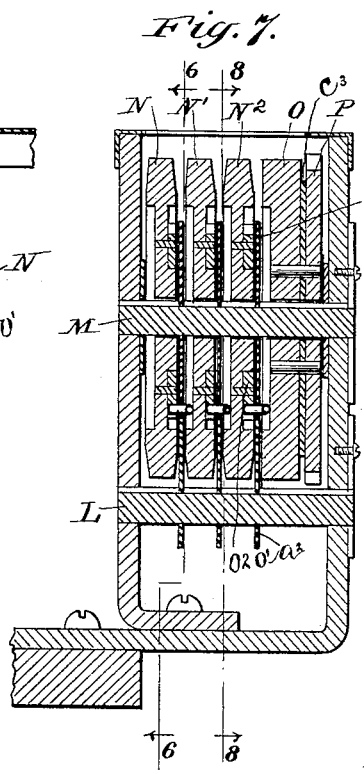
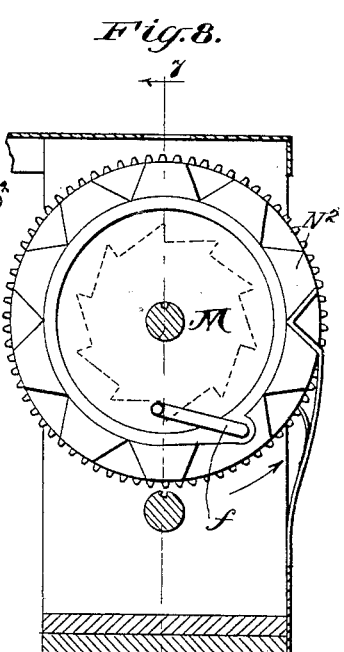
WITNESSES:
J. O. Criswell
C. Sedgwick
G. B. Massey deceased
INVENTOR:
S. R. Massey
S. A. Bryant
Administrators
BY
Munn & Co.
ATTORNEYS (No Model.) 5 Sheets—Sheet 5.
G. B. MASSEY, Dec'd.
S. R. Massey, Administratrix & S. A. Bryant, Administrator.
ADDING ATTACHMENT FOR CASH REGISTERING MACHINES.
No. 477,563. Patented June 21, 1892.
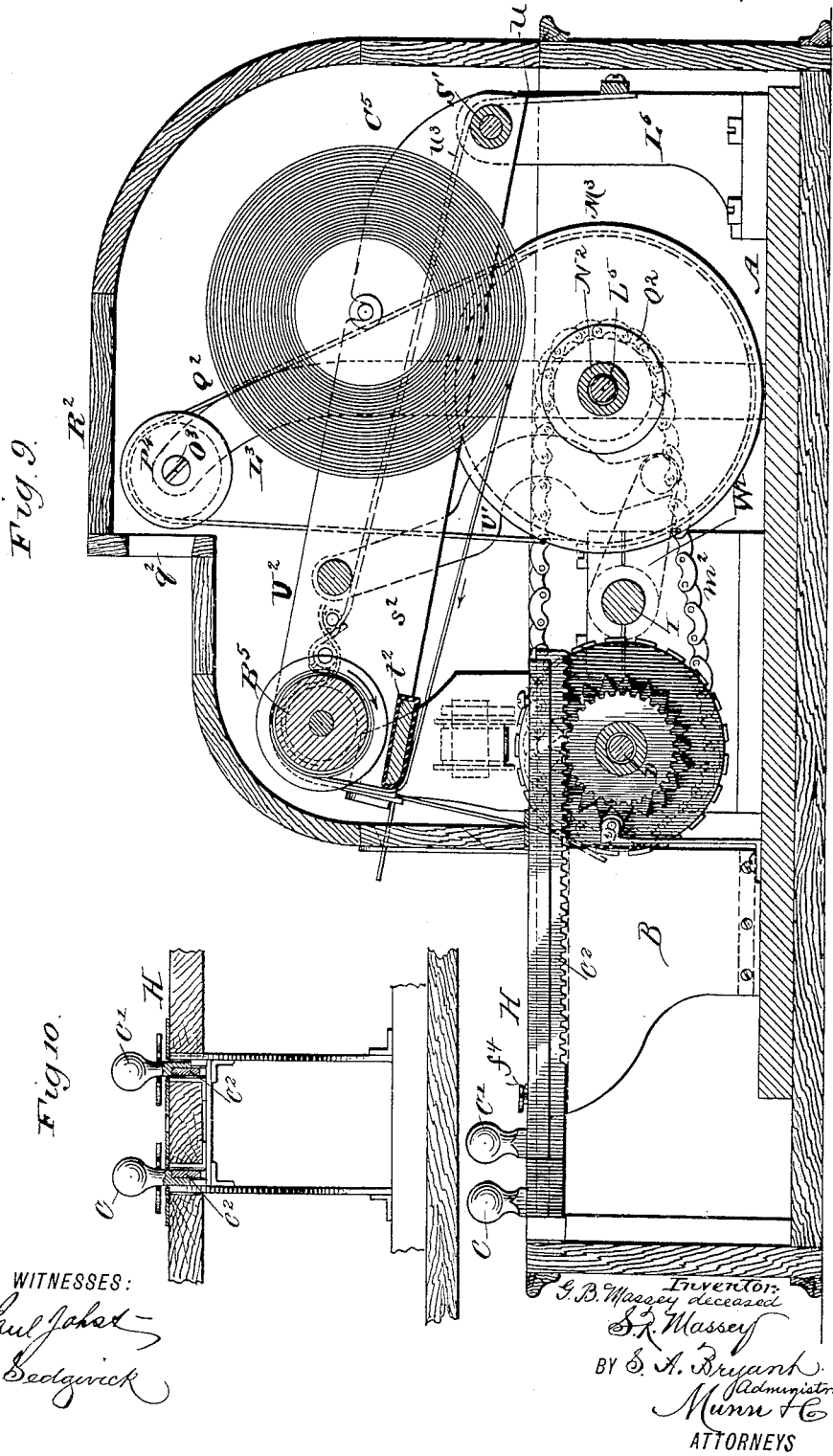

United States Patent Office.

SARAH R. MASSEY AND STANLEY A. BRYANT, OF MAMARONECK, ADMINISTRATORS OF GIDEON B. MASSEY, DECEASED, ASSIGNORS OF TWO-FIFTHS TO ALFRED B. DARLING, OF NEW YORK, N. Y.

ADDING ATTACHMENT FOR CASH-REGISTERING MACHINES.

SPECIFICATION forming part of Letters Patent No. 477,563, dated June 21, 1892.

Application filed July 3, 1890. Serial No. 357,621. (No model.)

*To all whom it may concern:*

Be it known that we, SARAH R. MASSEY and STANLEY A. BRYANT, both of Mamaroneck, in the county of Westchester and State of New York, administrators of the estate of GIDEON B. MASSEY, deceased, who did in his lifetime invent a new and Improved Adding Attachment for Cash-Registering Machines, do declare the following to be a full, clear, and exact specification of the same, reference being had to the annexed drawings, forming a part thereof, in which—

Figure 1 is a side sectional view of the improved adding attachment for cash-registering machines, the section being taken on line 1 1 in Fig. 2. Fig. 2 is a plan view with parts broken away. Fig. 3 is an enlarged vertical transverse section taken on lines 3 3 in Figs. 2 and 4. Fig. 4 is a vertical transverse section taken on lines 4 4 in Fig. 3. Fig. 5 is a vertical transverse section taken on line 5 5 in Fig. 3. Fig. 6 is a vertical transverse section of the adding machine, taken on line 6 6 in Fig. 7. Fig. 7 is a vertical longitudinal section taken on lines 7 7 in Figs. 1, 6, and 8. Fig. 8 is a longitudinal section taken on line 8 8 in Figs. 2 and 7. Fig. 9 is a vertical longitudinal section taken on line 9 9 in Fig. 2; and Fig. 10 is a vertical transverse section of the slides and their guides.

Similar letters of reference indicate corresponding parts in all the views.

The object of this invention is to provide an adding attachment to the cash-registering machine for which Letters Patent of the United States No 446,262 were granted February 10, 1891, to Sarah R. Massey and Stanley A. Bryant, administrators of the estate of Gideon B. Massey, deceased, the said attachment being designed for adding fractional parts of a dollar only, the dollars being added on the record-strip contained in the machine.

The invention consists in the combination, with the cash-register, of a toothed sector attached to the rock-shaft of the printing mechanism, a pinion placed on the shaft of the number-wheels and engaged by the toothed sector, a spring-pawl carried by the pinion and arranged to engage a notched wheel placed on the number-wheel shaft, a volute spring arranged to carry the notched wheel back to the point of starting after it has been moved by the pawl, a spur-wheel placed loosely on the number-wheel shaft and carrying a ratchet-wheel adapted to be engaged by the above-mentioned pawl, and a series of number-wheels provided with carrying mechanism and adapted to be engaged by the spur-wheel on the number-wheel shaft, all as will be hereinafter more fully described.

Upon the base-plate A is mounted the cash-registering mechanism B, as described in the patent to which reference has been made.

In standards $a^2$ $a^3$, secured to the base A, is journaled a shaft D, to which are secured number-wheels $C^3$ $C^4$, and upon the said shaft between the said number-wheels is loosely placed a sleeve D', upon which are mounted number-wheels $E^2$ $E^3$. To the same sleeve D' is secured a sprocket-wheel $F^2$, and to the shaft D, near the standard $a^3$, is secured a similar sprocket-wheel $F^3$.

To the inner side of the number-wheel $E^3$ is secured a pinion $b^2$, and to the outer side of the number-wheel $C^4$ is secured a pinion $b^3$. These pinions are engaged by racks $C^2$, secured to the bars C C'. The bars C C' slide in grooves in the table H and are provided with cross-bars $f^3$ $f^4$, extending a short distance over the upper surface of the table H.

Upon the top of the table H are arranged rows of figures and ciphers ranging from "0" to "19" on the left-hand column, and from "0" to "95" on the right-hand column, these figures being arranged with all the even numbers upon one side of the grooves in the table H, and all the odd numbers upon the opposite side. They are arranged in the paths of the cross-bars $f^3$ $f^4$, which serve as indexes.

The bar C' and the rack $C^2$, attached thereto, moves the wheels $C^3$ $C^4$, attached to the shaft D. The bar C and the rack $C^2$, attached thereto, turns the sleeve D' and the number-wheels $E^2$ $E^3$ attached thereto. The numbers upon the wheels $C^3$ $E^2$ are oppositely arranged with respect to the numbers on the wheels $E^3$ $C^4$, so that while the numbers on the tickets printed on the wheels $C^3$ $E^2$ are inverted as they issue from the machine, the numbers printed on the wheels $E^3$ $C^4$ are right side up. The shaft D carries a star-wheel $I^3$, and the sleeve D' carries a star-wheel $I^4$. These wheels are engaged by registering-springs $J^3$ $J^4$, attached to the base A, and provided with rollers which are engaged by the teeth of the star-wheel.

To the base A are secured standards $L^3$ $L^4$, in which is secured a rod $L^5$, upon which are loosely placed the wheel $M^2$ and the sleeve $N^2$. The wheel $M^2$ is provided with a sprocket-wheel $O^2$, which is connected by a chain $m^2$ with the sprocket-wheel $F^2$ on the sleeve D'. Upon the end of the sleeve $N^2$, adjoining the wheel $M^2$, is mounted the wheel $M^3$, and upon the opposite end of the said sleeve is mounted a sprocket-wheel $P^2$, which receives its motion from the sprocket-wheel $F^3$ on the shaft D. In the upper end of the standard $L^3$ is inserted a stud $O^3$, upon which are placed pulleys $P^4$. Upon one of the pulleys $P^4$ and wheel $M^2$ is placed an endless belt $Q^2$, carrying numbers corresponding to the hundreds on the number-wheels and on the table H, and upon the other pulley $P^4$ is placed a belt $Q^2$, carrying numbers corresponding to the units and tens of the table H and number-wheels.

In the front of the casing $R^2$, which incloses the mechanism, is an aperture $q^2$, through which are displayed the figures on the belts $Q^2$, corresponding with the numbers to be printed in the manner presently to be described. The standards $L^6$ $L^7$, attached to the base A, support a rod S', upon which are pivoted arms $s^2$, the free ends of which are secured to a cross-bar $t^2$, the said arms and cross-bar forming the printing-frame $U^2$. In standards attached to the base-plate A is journaled a rock-shaft I, which carries the crank-arms W' $W^2$, which are pivotally connected with opposite sides of the printing-frame by a curved connecting-rod B'. The rock-shaft I extends through the casing $R^2$, and is provided with a hand-crank $A^6$, by which it may be turned. The frame $U^2$ is provided with a spring $U^3$, which extends over the rod S' and is secured to the standard $L^6$, the said spring being designed to lift the frame $U^2$ after it has been depressed by turning the shaft I in the operation of printing.

In the frame $U^2$ is journaled a paper-roller $B^5$. The cross-bar $t^2$ serves as a platen or impression-plate, and the paper upon which the tickets are printed and upon which the permanent record is made passes from the paper-roll $C^5$, journaled in the frame $U^2$, thence under the bar $t^2$ to the paper-roll $B^5$. Upon the shaft of the paper-roll $B^5$ is mounted a ratchet-wheel $D^5$, which is operated by a pawl $E^5$, pivoted to the standard $L^7$, each time the frame $U^2$ is raised up after printing.

On either side of the machine in the frame attached to the main frame is journaled an ink-ribbon roller $F^5$, provided with a ratchet-wheel $G^5$, which is engaged by a pawl $H^5$, carried by the frame $U^2$. These pawls are alternately thrown out of engagement with the ratchet, so that the ink-ribbon is fed first in one direction and then in the other. By this arrangement, whenever the hand-lever $A^6$ is raised, the printing-frame $U^2$ is depressed, bringing the paper carried thereby into contact with the number-wheels $C^3$ $E^2$ $E^3$ $C^4$, producing an impression upon the paper strip of the numbers presented. One of the said strips is projected through the front of the casing and cut off, forming a ticket. The other is retained in the casing. At the same time the endless belts $Q^2$, present at the openings $q^2$ in the front of the casing $R^2$, the figures corresponding with those printed upon the paper slips. The position of the number-wheels from which the impression is taken is governed by the position of the sliding-rods C C'.

The machine as described up to this point is the same as that already described and claimed in the patent above referred to and forms no part of the present invention, except in so far as it enters into combination with it, in the manner hereinafter specified.

The shaft D, which carries the fractional number-wheels of the cash-register, is prolonged beyond the number-wheels to receive the loose pinion E, the chambered wheel F, the loose spur-wheel G, and the ratchet-wheel H, attached to the spur-wheel. The boss of the pinion E carries an arm $a$, to which is pivoted a spring-pressed pawl $b$, which is adapted to drop into the notch $c$ in the periphery of the chambered wheel F, and also to engage the teeth of the ratchet-wheel H, carried by the spur-wheel G.

Upon the rock-shaft I of the printing mechanism of the cash-register is mounted a toothed sector J, which engages the loose pinion E, so that whenever the rock-shaft I is turned in the operation of printing the pinion E will be turned through nearly one revolution and the wheel G will be carried around through a part of a revolution, the distance being determined in the manner presently to be described.

To the shaft D is secured one end of a volute spring K, the opposite end of which is attached to a pin $d$, projecting from the face of the wheel F within the chambered portion of the said wheel. In the shaft D is inserted a pin $e$, which extends radially into the path of the pin $d$. In front of the shaft D is arranged a frame L, which is attached to the base of the cash-register, and in it is secured the rod M, upon which are placed the number-wheels N N' $N^2$ and the double number-wheel O, which carries upon its periphery figures ranging from "0" to "95," the series ascending by five. To the number-wheel O is attached a spur-wheel P, which is engaged by the spur-wheel G on the shaft D. Every revolution of the wheel O carries forward the wheel $N^2$ one notch, registering for each such movement one dollar. The wheel N' is carried forward one notch by a complete revolution of the wheel $N^2$, and in a similar manner the wheel N is moved forward one notch by a complete revolution of the wheel N'. The motion of the number-wheel O and the spur-wheel P, which is attached to the said number-wheel, is always in the same direction, the motion being effected by the continued forward movement of the wheel G and ratchet-wheel H, attached thereto, the said ratchet-wheel being carried forward one or more notches by the pawl $b$ in the manner already described.

As the attachment is designed only for adding fractions of a dollar, it is connected only with the wheel of the cash-register, which registers the cents. Every movement of the fractional wheel shifts the position of the pin $e$ in the chambered wheel F, and the spring K carries back the chambered wheel a distance corresponding with the space through which the fractional-wheel of the cash-register is moved, thereby locating the notch $c$ of the wheel F opposite a tooth of the ratchet-wheel H, which will insure the required movement of the wheels G, P, and O. When the printing-lever is moved in the operation of printing and cutting off a ticket, the toothed sector J causes the pinion E and pawl $b$, carried thereby, to make nearly a complete revolution. Before the pawl drops into the notch of the wheel F the ratchet-wheel H is not engaged by the said pawl, but when the pawl in the course of its revolution drops into the notch of the wheel F, it also engages one of the teeth of the ratchet-wheel H and carries forward the said wheel to the extreme limit of the excursion of the said pawl. This operation moves forward the adding mechanism and registers the number printed by the cash-register. Upon the return of the printing-lever to the point of starting the pawl $b$ retraces its path, the wheel F is returned to the point of starting by the spring K, and the pawl $b$ is returned to the zero-point preparatory to another similar operation.

In the fare-register dollars are printed upon the strip and may be readily added. The cents are added mechanically in the manner already described, and the aggregate of such an addition in dollars may be readily added to the dollars recorded by the register.

Having thus described the invention, what we claim as new, and desire to secure by Letters Patent, is—

1. The combination, with the rock-shaft and number-wheel shaft, of a series of auxiliary adding-wheels provided with carrying mechanism, pawl-and-ratchet mechanism provided with a limiting device operated by the number-wheel shaft of the cash-register, and number-wheel moving devices connected with the rock-shaft of the printing mechanism of the cash-register for operating the auxiliary adding-wheels, substantially as specified.

2. The combination, with the number-wheel shaft D and rock-shaft I of a cash-register, of the toothed sector J, carried by the shaft I, the pinion E, loosely mounted on the shaft D, the pawl $b$, carried by the said pinion E, the notched and chambered wheel F, provided with the stud $d$, the spring K, contained by the wheel F, and having one end thereof attached to the shaft D, with the other end secured to the stud $d$, the stop-pin $e$, inserted in the shaft D and adapted to engage the stud $d$, the spur-wheel G, and the ratchet-wheel H, rigidly connected with each other and loosely mounted on the shaft D, and a series of number-wheels constructed to be operated by the spur-wheel G, substantially as specified.

3. In an adding attachment for cash-registering machines, the combination, with the number-wheel shaft and operating mechanism of the adding device, of a spring-pressed notched and chambered wheel placed loosely on the number-wheel shaft, and a pin projecting from the said shaft and adapted to set the notched wheel, substantially as specified.

SARAH R. MASSEY,
STANLEY A. BRYANT,
*Administrators of the estate of Gideon B. Massey, deceased.*

Witnesses:
A. T. HOFFMAN,
LAURA A. BRYANT.